Sept. 12, 1967     R. H. SEVY     3,341,420

MODULAR FLUX TRAP REACTOR

Filed Oct. 4, 1965     2 Sheets-Sheet 1

INVENTOR.
ROBERT H. SEVY

BY
ATTORNEY

Sept. 12, 1967  R. H. SEVY  3,341,420

MODULAR FLUX TRAP REACTOR

Filed Oct. 4, 1965  2 Sheets-Sheet 2

INVENTOR.
ROBERT H. SEVY
BY
ATTORNEY

United States Patent Office 3,341,420
Patented Sept. 12, 1967

3,341,420
MODULAR FLUX TRAP REACTOR
Robert H. Sevy, Woodland Hills, Calif., assignor, by mesne assignments, to the United States of America as represented by the United States Atomic Energy Commission
Filed Oct. 4, 1965, Ser. No. 492,771
7 Claims. (Cl. 176—18)

The present invention is directed to fast reactors and more particularly to fast breeder-converter reactors with improved safety characteristics.

The advantages of utilizing a liquid metal coolant, such as sodium, for nuclear reactors of the fast neutron type are well established. The advantages of sodium include excellent heat removal capability, low pressure at elevated temperatures, and small neutron moderating effect. However, of particular concern in the development of fast neutron sodium cooled reactors has been the positive reactivity effect resulting from loss of sodium from the core. The present invention is directed to the reduction of the positive sodium void coefficient by utilizing the large neutron leakage which results from a coupled core arrangement.

The modular flux trap arrangement of the present invention utilizes a periodic array of highly enriched fast regions each positioned in an environment of low enrichment internal blanket regions which have strong local neutron moderation provided by a region of moderating material. In this arrangement the fast regions are small and therefore have high neutron leakage probabilities thus making possible a substantial reduction in the sodium void coefficient. These fast regions are effectively isolated from each other by flux traps in the internal blanket regions where those regions utilize both heavy and light materials to provide an effective barrier to fast neutron transmission between fast regions. The light moderating materials function to increase isolation and to provide strong local moderation which greatly improves the Doppler response of the system. Accordingly, the present invention is directed to a modular flux trap reactor core arrangement in which a plurality of individually subcritical fast regions are utilized to minimize the sodium void problem, and in which cooperating regions of blanket and moderator regions provide fast region isolation, local moderation for enhanced Doppler effect, and high burnup of blanket fuel.

It is therefore the primary object of the present invention to provide a nuclear reactor core arrangement utilizing a plurality of coupled subcritical fast fuel regions to enhance reactor control capability.

It is also the object of the present invention to provide a sodium cooled reactor of improved safety characteristics in which an increased Doppler effect, decreased sodium void effect and increased prompt neutron lifetime are utilized to decrease the possibility of an uncontrolled excursion.

It is another object of the present invention to provide a sodium cooled reactor core arrangement utilizing subcritical fast and subcritical thermalized regions coupled to form a critical reactor system.

It is a further object of the present invention to provide a core arrangement having a plurality of modular fuel arrays, each array having a fast region and a thermal region, the plurality of arrays being neutronically intercoupled to provide a critical reactor system.

These and other objects of the present invention will be more apparent from the following detailed description and drawings, made a part thereof, in which.

Figure 1:
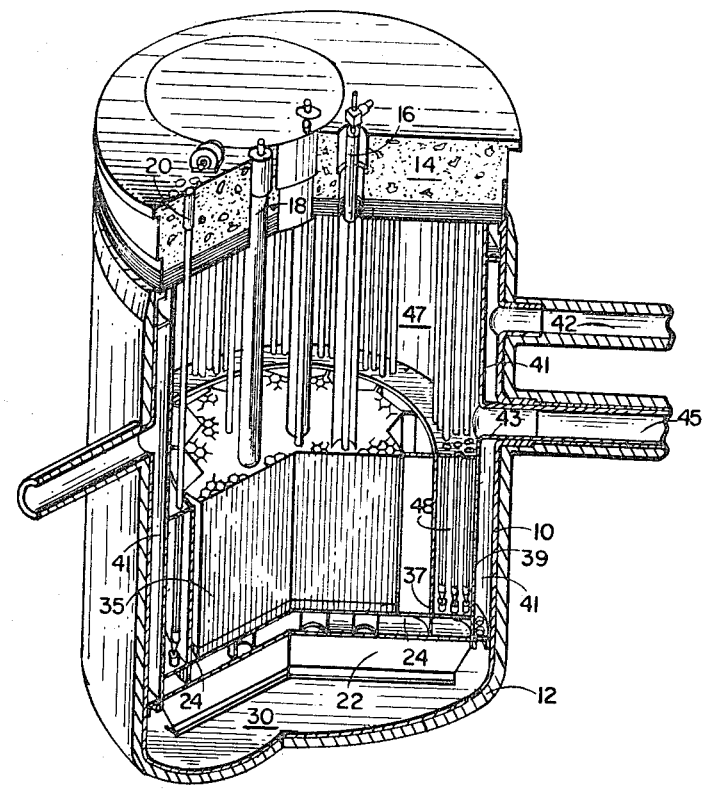
FIG. 1 is a partially sectioned perspective view of a reactor utilizing the arrangement of the present invention.

Referring now to the drawings in detail, FIG. 1 shows a reactor assembly utilizing the core arrangement of the present invention. The reactor will be described utilizing the preferred coolant, sodium, although other liquid metal coolants may also be utilized. The reactor system comprises a reactor vessel 10 with appropriate insulation 12, having a rotating top shield 14 through which control rod actuating mechanisms 16, instrument and control rod guide tubes 18, fuel removal guide tubes 20, fuel handling mechanisms and similar well-known components extend into the reactor vessel 10. Supported within the lower portion of vessel 10 is a grid plate support structure 22 consisting of structural support beams and grid plate 24. The core, indicated generally at 35, and including a plurality of elements supported in adjacent vertical positions by the grid plate 24, is enclosed in thermal shield 37. A second thermal shield 39 supported by support structure 22 extends upwardly to the top shield 14 and defines the inlet coolant passage 41 connecting the coolant inlet nozzle 42 to the sodium inlet plenum 30. The interior volume of shield 39 is connected through pipe 43 to the outlet coolant nozzle 45. In this manner the liquid sodium coolant passes down the outer portion of the reactor vessel volume, upwardly through the core to the top plenum 47 above the core, and through outlet 45 to appropriate heat exchanging apparatus (not shown). The concentric shields 37 and 39 adjacent the core 35 form a fuel storage volume 48 in which spent fuel elements are placed.

While the preferred embodiment utilizes a grid plate arrangement for support and flow distribution to the various core elements, a modular pedestal arrangement for supporting core elements similar to that of U.S. Patent No. 3,178,356 may also be utilized.

Figure 2:
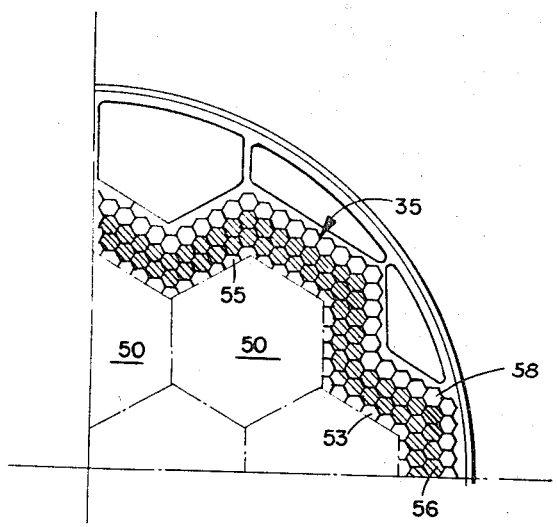
FIG. 2 is a cross-sectional view of one quadrant of the modular core arrangement of the preferred embodiment of the present invention.

The preferred core arrangement of the present invention is shown in FIG. 2 and comprises 1172 hexagonally-shaped core elements in a modular array forming ten core modules or zones 50 arranged in a three-four-three abutting relationship, only one quadrant being illustrated for simplicity. Each module 50 (see FIG. 3) has a centrally located fast section 51 of 18 fast fuel elements 52 surrounded by a single row of 18 inner blanket fuel elements 53, which is in turn surrounded by a row of 21 moderator elements 54. The moderator elements are also surrounded by a single row of blanket elements 55 which row is common to adjacent modules and includes a total of 196 elements. The entire modular core, see FIG. 2, is surrounded by 238 reflector (moderator) elements 56, which in turn are surrounded by 128 outer-outer blanket elements 58 or stainless steel shielding elements if desired. In each module 50 a control element 60 is preferably located in the center of the fast section 51 with three additional elements, equally spaced from each other, being located in the moderator region 54. The fast fuel, moderator (reflector), and blanket (thermal) elements are structurally interchangeable within the core so that modifications to the core arrangement may be made if desired.

Figure 4:
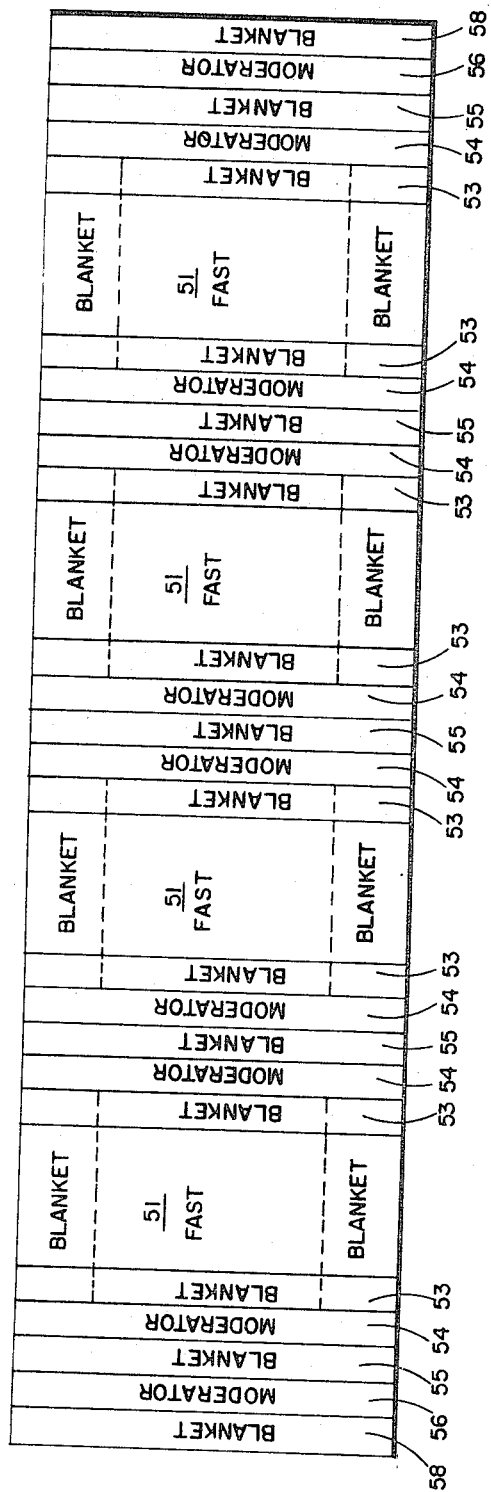
FIG. 4 is a schematic elevational cross-sectional illustrating the modular arrangement of FIG. 2.

The preferred arrangement results in a sectionalized core having a variety of regions. FIG. 4 shows schematically the effect of the modular arrangement with respect to a vertical plane passing through the center of the core depicted in FIG. 2. It is clear from this representation that the illustrated fast regions 51 are intercoupled through lower energy neutron absorption regions generated by the interaction of the moderator elements 54 and blanket elements 53 and 55 in each module. In the preferred embodiment those portions of the core above and below the fast regions are occupied by blanket material, as described in detail hereinafter.

The preferred fast fuel elements 52 are of standard design and therefore will not be described in detail. In general, each comprises a bundle of rods in close packed hexagonal array in a convention rod support box. Each rod is a 9.5 foot long tube of stainless steel having an outside diameter of 0.250 inch and a wall thickness of 0.015 inch. The fuel consists of 86 percent dense pellets of mixed oxide with a composition of 75 percent $UO_2$ (normal) and 25 percent $PuO_2$ with an oxygen to metal ratio of about two. The central section of the rod contains 50.4 inches of mixed oxide fuel pellets having an average enrichment of 25 percent consisting essentially of $Pu^{239}$. Top and bottom axial blanket sections are provided within each tube, as noted above, which consists of 18 inches of natural (0.7 percent $U^{235}$) $UO_2$ pellets. The remaining 24 inch section above the blanket section is a gas trap and plenum volume for fuel expansion and fission gas venting.

The preferred blanket elements 53, 55 and 58 ar similar in structuret ot he fast element and are of standard construction. These elements have the same external configuration and dimensions as the fuel element. The primary modification is the use of 126 blanket rods of 0.340 inch diameter with 0.010 inch wall stainless steel. These rods are 9.5 feet long and contain cold pressed and sintered material $UO_2$–$PuO_2$ pellets with sufficient plutonium to provide an inital enrichment of about 3 or 4 percent. The height of the fuel section is 7.2 feet with a two foot gas space at the upper end of each rod. The blanket elements 53 and 55, which are utilized as a part of the neutron barrier means in each module, have an average initial enrichment of about 3 or 4 percent. Because of the subsequent conversion of the $U^{238}$ to $Pu^{239}$ this enrichment is increased during operation and subsequently added blanket elements 53 and 55 are fueled with only depleted uranium so that an average enrichment of 3–5 percent is maintained in these regions of the core. The outer blanket elements 58, however, are initially loaded with depleted uranium. Thus, the module blanket elements 53 and 55, after a period of operation, start as depleted uranium and are allowed to remain in the core until there is an average enrichment of from about 3.5 to about 4 percent. The average enrichment of 3.5 to 4 percent is optimum for the particular design and other enrichments may be utilized. However, where the average enrichment is greater than the optimum the sodium coefficient suffers, while the Doppler effect and power carried by the blanket improves. Decreasing the average enrichment has the opposite effect. Thus, average enrichment values are chosen which provide optimum operating safety for the particular core design.

The preferred moderator or reflector elements 54, 56 are identical and are similar in structure to the fast fuel and blanket elements except that no rods are utilized. They are of standard design and therefore are not described in detail. In place of the rods is a sealed container in which blocks of moderator, e.g., graphite, are positioned over the length of the element corresponding to the core height. While the preferred moderator element 54 and 56 utilize graphite moderator blocks, the use of other moderating materials, such as BeO and ZrH, or other structural forms, is within the purview of the present invention.

Figure 3:
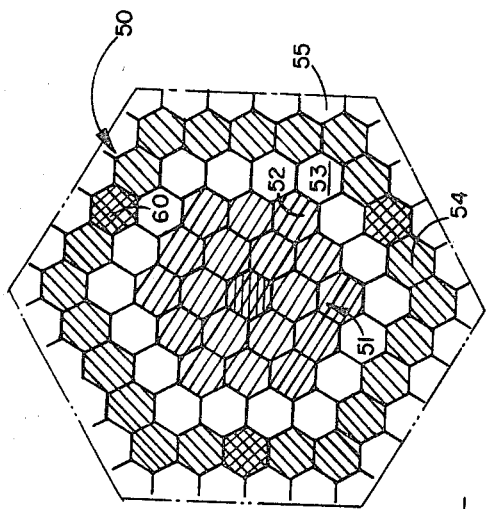
FIG. 3 is a cross-sectional view of the arrangement of elements within each of the modules of FIG. 2.

The above described core arrangement utilizing the preferred arrangement shown in FIGS. 1–3 provides a reactor having the general characteristics shown in Table I.

TABLE I

A. General:
1. Breeding ratio (average) —— 1.31.
2. Doubling time including ex-core needs (yr.) —— 15.3.
3. Sodium void worth ($):
   a. 100% core voided —— $<-0.75$.
   b. Maximum reactivity condition —— $+0.53$.
4. Doppler coefficient $[-T(dk/dT)]$:
   a. Fast region —— 0.002298.
   b. Inner blanket region —— 0.009024.
   c. Outer blanket region —— 0.006782.
   d. Total —— 0.0181.
5. Doppler reactivity worth to point of fuel damage (operating temperature to fuel centerline of hottest pin at 6500° F.) ($) —— $-1.52$.
6. Average initial specific power (kw./kg.):
   a. Fast region U+Pu metal —— 173.
   b. Fast region fissile —— 634.
   c. Blanket metal —— 16.7.
7. Reactor power (Mwt):
   a. Fast region —— 1388.
   b. Blankets:
      (1) Axial —— 125.
      (2) Radial —— 937.
   c. Gamma heating —— 50.
   d. Total —— 2500.
8. Size (ft.):
   a. Reactor diameter —— 15.
   b. Core height —— 7.2.
   c. Vessel diameter —— 26.
   d. Vessel height —— 41.5.
9. Temperature (° F.):
   a. Core inlet —— 750.
   b. Clad peak (fast region) —— 1285.
   c. Fuel peak (fast region) —— 4800.
   d. Core outlet, mixed mean —— 1075.
   e. Core maximum:
      (1) Hot channel —— 1190.
      (2) Nominal —— 1150.
   f. Fuel gap filler (type) —— Gas (helium).
10. Coolant:
    a. Total sodium flow (lb./hr.) —— $87 \times 10^6$.
    b. Velocity (ft./sec.):
       (1) Fast —— 18.5.
       (2) Blanket —— 11.6.
    c. Core pressure drop (p.s.i.):
       (1) Fast —— $\sim 50$.
       (2) Blanket —— $\sim 15$.
11. Control:
    a. Number of units —— 40.
    b. Location —— Center of fast and moderator regions.
    c. Material:
       (1) Fast region —— $B_4C$.
       (2) Moderator region —— Rare earths.
    d. Follower —— Sodium.

B. Core and Blanket:
1. Core active height (ft.) —— 4.2.
2. Blanket:
   a. Arrangement —— Radial modular split blankets and axial blankets.
   b. Thickness (radial modular blankets) (in.) —— 4.8.
3. Moderator:
   a. Arrangement —— Hexagonal elements.
   b. Material —— Graphite with SS cladding.

TABLE I—Continued c. Thickness (in.) _____ 4.8.
4. Fast region fissile material, initial (kg.) _____ 2,187.
5. Blanket fissile metal, initial (kg.) _____ 866.
6. Fast region loade metal (kg.) __ 8,010.
7. Blanket load metal (kg.) _____ 63,760.
8. Core volume excluding axial blanket (liters) _____ 13,200.
9. Core volume fractions (percent):
   a. Fuel _____ 31.0.
   b. Sodium _____ 53.8.
   c. Steel _____ 15.2.
10. Blanket volume fractions (percent):
   a. Fuel _____ 49.1.
   b. Sodium _____ 38.1.
   c. Steel _____ 12.8.

C. Pins:
1. Fast Region:
   a. Fuel pin clad O.D. (in.) ____ 0.250.
   b. Clad thickness (in.) _____ 0.015.
   c. Gap (in.) _____ 0.003.
   d. Pellet O.D. (in.) _____ 0.214.
   e. Active core height (in.) ____ 50.
   f. Axial blanket height (each end) (in.) _____ 18.
   g. Gas reservoir (in.) _____ 21.
   h. Overall pin length (in.) _____ 113.
   i. Vented or contained fission gas _____ Vented.
2. Radial blanket (contained fission gas):
   a. Fuel pin clad O.D. (in.) ____ 0.340.
   b. Clad thickness (in.) _____ 0.010.
   c. Pellet O.D. (in.) _____ 0.320.
   d. Active blanket height (in.) __ 50.
   e. Total blanket height (in.) ___ 86.
   f. Vented or contained fission gas _____ Contained.

D. Assemblies:
1. Fast Region:
   a. Assembly across flats (in.) __ 4.875.
   b. Triangular pitch of pins (in.) _____ 0.356.
   c. Pins per assembly _____ 168.
   d. Average enrichment (percent) _____ 25.
   e. Pellet material _____ $PuO_2$-$UO_2$ (cold pressed and sintered).
   f. Pellet density (gm./cc.) _____ 9.52.
   g. Pellet conductivity (B.t.u./hr.-ft.-° F.) _____ 1.88.
2. Radial Blanket:
   a. Assembly across flats (in.) __ 4.875.
   b. Triangular pitch of pins (in.) _____ 0.418.
   c. Pins per assembly _____ 126.
   d. Average enrichment at equilibrium _____ 3.5.
   e. Pellet material (feed) _____ $UO_2$ (depleted).

E. Power and Flux:
1. Fast Region:
   a. Power, average (Mwt) _____ 1388.
   b. Lineal power, average (kw./ft.) _____ 11.1.
   c. Lineal power, maximum (kw./ft.) _____ 22.7.
   d. Peaking factors:
     (1) Hot channel _____ 1.41.

TABLE I—Continued (2) Radial _____ 1.13.
     (3) Axial _____ 1.28.
     (4) Total _____ 2.04.
   e. Median fission energy (kev.):
     (1) Fast region _____ 210.0.
     (2) Blanket region _____ 73.0.
   f. Prompt neutron lifetime ($\mu$sec.) _____ 3.2.
   g. Effective delayed neutron fraction _____ 0.00335.
2. Radial Blanket:
   a. Power, average (Mwt) _____ 937.
   b. Average lineal power (kw./ft.) _____ 13.
   c. Maximum lineal power (kw./ft.) _____ 18.8.
   d. Peaking factors:
     (1) Hot channel _____ 1.41.
     (2) Radial _____ 1.89.
     (3) Axial _____ 1.25.
     (4) Total _____ 3.33.

It is apparent from the above described embodiment that the present invention utilizes a plurality of small fast regions in the core thereby increasing neutron leakage probabilities and reducing the sodium void coefficient. Further, the fast regions are effectively isolated from each other by flux traps comprising a pair of blanket regions separated by a moderator region. The use of low enrichment blanket or thermal neutron absorption regions for flux trapping provides a sink for low energy neutrons, improves the Doppler effect on core reactivity and extends burnup of the blanket fuel by permitting the fuel to remain in the core for longer times. The use of an intermediate moderating region results in each flux trap being more effective since it serves the double function of materially increasing fast neutron isolation as well as providing strong local neutron moderation which greatly improves Doppler response of the system.

Although a particular embodiment of the present invention has been described, various modifications will be apparent to those skilled in the art without departing from the scope of the invention. For example, instead of the hexagonal array of the preferred embodiment, it is within the purview of the invention to achieve similar reactor characteristics with an analogous rectangular or other geometric array. Furthermore, the positivity or negativity of the various reactivity coefficients, such as Doppler and void coefficients, and the inventory and breeding ratio may be varied to affect different safety and economic characteristics by varying the relative ratios and enrichment of fast fuel/blanket fuel/moderator. Therefore, the present invention is not limited to the specific embodiments disclosed but only by the appended claims.

I claim:

1. A fast breeder nuclear reactor core comprising a plurality of non-concentric fast regions spaced from each other, each of said fast regions having a plurality of fast fuel elements and an annular concentric barrier means around each region, each of said barrier means comprising a pair of spaced concentric thermal neutron absorption regions, one of said thermal regions being concentrically positioned adjacent to and around each fast region and a moderator region positioned between said pair of thermal neutron absorption regions.

2. A fast breeder nuclear reactor core comprising a plurality of modular zones positioned in abutting relationship, each of said zones comprising a fast fuel element region, a first lower energy neutron absorption breeder blanket region positioned concentrically about said fast region, a moderator region positioned concentrically about said first absorption breeder blanket region, a second lower energy absorption region positioned concentrically about said moderator region, said second absorption region being common to a plurality of said modular zones.

3. The fast nuclear reactor core of claim 2 wherein each of said modular zones is hexagonally shaped and said plurality of abutting zones are surrounded by an outer moderating region and a blanket region.

4. A modular flux trap fast breeder reactor comprising a vessel, a nuclear core, means for supporting said core in said vessel, means for passing a liquid metal coolant through said core, said core comprising a plurality of modular zones positioned in abutting relationship, each of said zones comprising a plurality of enriched fast fuel elements, a first low energy neutron absorption breeder blanket region positioned concentrically about said fast fuel elements, a moderating region positioned concentrically about said first absorption region, and a second low energy neutron absorption breeder blanket region positioned concentrically about said moderator region, said first and second absorption regions being enriched.

5. The reactor of claim 4 wherein said absorption regions each include a plurality of blanket fuel elements, said blanket fuel having an enrichment of from about three to about four percent of plutonium.

6. The reactor of claim 4 wherein each of said fast fuel elements contains a central fuel containing section having a fissile plutonium enrichment of about 25 percent and a top and bottom blanket section of natural uranium.

7. The reactor of claim 4 wherein said moderator region comprises a plurality of graphite containing elements.

References Cited

UNITED STATES PATENTS

| | | | |
|---|---|---|---|
| 3,125,760 | 5/1964 | Foster et al. | 176—41 |
| 3,140,237 | 7/1964 | Peterson et al. | 176—18 |
| 3,141,829 | 7/1964 | Fortescue et al. | 176—71 |
| 3,154,471 | 10/1964 | Radkowsky | 176—17 |
| 3,186,913 | 6/1965 | Reisner et al. | 176—41 X |
| 3,238,105 | 3/1966 | McNelly | 176—41 X |

FOREIGN PATENTS 841,545   7/1960   Great Britain.

OTHER REFERENCES

Interatom, German application 1,187,332, printed Feb. 18, 1965, (K1 21g–21/20), 3 pp. spec., 2 shts. dwg.

REUBEN EPSTEIN, *Primary Examiner.*